(12) United States Patent
Senatori et al.

(10) Patent No.: US 9,851,748 B2
(45) Date of Patent: Dec. 26, 2017

(54) DISPLAY MEMBER AND BASE MEMBER MAGNETICALLY ATTRACTED

(71) Applicant: HEWLETT-PACKARD DEVELOPMENT COMPANY, L.P., Houston, TX (US)

(72) Inventors: Mark David Senatori, Houston, TX (US); Insun Hong, Houston, TX (US); Dimitre Mehandjiysky, Houston, TX (US); Kevin L Massaro, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 20 days.

(21) Appl. No.: 14/892,227

(22) PCT Filed: Aug. 22, 2013

(86) PCT No.: PCT/US2013/056195
§ 371 (c)(1),
(2) Date: Nov. 19, 2015

(87) PCT Pub. No.: WO2015/026351
PCT Pub. Date: Feb. 26, 2015

(65) Prior Publication Data
US 2016/0154428 A1 Jun. 2, 2016

(51) Int. Cl.
*G06F 1/16* (2006.01)
(52) U.S. Cl.
CPC ......... *G06F 1/1616* (2013.01); *G06F 1/1637* (2013.01); *G06F 1/1662* (2013.01); *G06F 1/1679* (2013.01); *G06F 1/1681* (2013.01)

(58) Field of Classification Search
CPC .... G06F 1/1632; G06F 1/1654; G06F 1/1626; G06F 1/1662; G06F 1/1679; G06F 1/1616; G06F 1/1669; G06F 1/1637; G06F 1/16; G06F 1/1643; G06F 1/1666;
(Continued)

(56) References Cited

U.S. PATENT DOCUMENTS 6,005,767 A 12/1999 Ku et al.
7,762,515 B2 * 7/2010 Lin .................. F16M 11/24
248/133
8,290,549 B2 10/2012 Reeves et al.
(Continued)

FOREIGN PATENT DOCUMENTS

| CN | 202948372 | 5/2013 |
|---|---|---|
| EP | 2557473 A1 | 2/2013 |
| KR | 10-2008-0006404 | 1/2008 |

OTHER PUBLICATIONS

Hamburger, "Logitech Solar Keyboard Folio", <http://www.theverge.com/2012/8/9/3229047/best-ipad-keyboard>, Aug. 9, 2012.
(Continued)

*Primary Examiner* — Anthony Haughton
*Assistant Examiner* — Ingrid Wright
(74) *Attorney, Agent, or Firm* — HP Patent Department (57) ABSTRACT

A display member and a base member. A support member can be attached between the display member and the base member. The support member can extend from the display member. A magnetic latch can magnetically attract an edge of the display member to one of the support member and the base.

16 Claims, 6 Drawing Sheets

(58) Field of Classification Search
CPC ...... G06F 1/1618; G06F 1/1633; G06F 1/166; G06F 1/1667; G06F 1/1681
USPC ............ 361/679.02, 679.09, 679.21, 679.26, 361/679.27; 455/575.1–575.4; 379/433.11–433.13; 248/917–924
See application file for complete search history.

(56) References Cited

U.S. PATENT DOCUMENTS

| | | | |
|---|---|---|---|
| 8,988,354 B2 * | 3/2015 | Milhe | G06F 1/1671 345/168 |
| 9,280,181 B2 * | 3/2016 | Tomita | G06F 1/1637 |
| 2005/0078444 A1 | 4/2005 | Hong | |
| 2006/0077622 A1 | 4/2006 | Keely et al. | |
| 2011/0182018 A1 | 7/2011 | Wu et al. | |
| 2013/0178155 A1 | 7/2013 | Shulenberger | |
| 2013/0194739 A1 | 8/2013 | Nakajima | |
| 2014/0219626 A1 * | 8/2014 | Weber | H05K 5/03 386/224 |

OTHER PUBLICATIONS

Korean Intellectual Property Office, International Search Report and Written Opinion for PCT/US2013/056195 dated May 22, 2014 (12 pages).

* cited by examiner

DISPLAY MEMBER AND BASE MEMBER MAGNETICALLY ATTRACTED

BACKGROUND

A laptop is a portable personal computer with a clamshell form factor suitable for mobile or stationary use. A tablet computer is a one-piece mobile computer. A tablet may have a touchscreen to enable interaction with a finger or stylus. Due to its lack of a physical input device, such as a physical keyboard, a tablet may be well suited for content consumption. Conversely, a laptop may be better suited for content creation due to the inclusion of physical input devices.

BRIEF DESCRIPTION OF THE DRAWINGS

Some examples of the invention are described with respect to the following figures.

DETAILED DESCRIPTION

A device that can provide the content consumption benefit of not having the physical input devices between a user and the display such as with a tablet combined with the content creation benefit of a laptop that has the physical input devices to provide a user with a single device for both consumption and creation tasks. In various examples, a device may have a tablet mode and a laptop mode. In the laptop mode at least a touch sensitive pointing device or physical keyboard can be accessible to the user. In the tablet mode one or more of these input devices (i.e., touch sensitive pointing device or physical keyboard) are rendered inaccessible by the user to render the device more suitable for other purposes. The device may also include hybrid mode where one physical input device is accessible and another input device is not accessible to the user.

A laptop computing device can include a closed mode where the display in a display member is facing the base member and preventing access to the physical input devices however if the display member could be inverted relative to the base member the user could use the computing device without the physical input devices between the user and the display. If the display member can rotate relative to a support member and the support member can rotate relative to the base then when the bottom of the display member is extended from the back of the base member the display member becomes inverted allowing the display to be visible when the physical input devices are not accessible.

In one example a computing device can include a display member and a base member with a first surface. A support member can be attached between the display member and the base member. The support member can extend from the display member at a plurality of angles. A magnetic latch can magnetically attract an edge of the display member to one of the support member and the first surface of the base member.

In another example, a portable computing device can include a base member having a back edge and a front edge. A support member can be rotatably attached to the back edge of the base member. A display member can be rotatably attached to the support member. A plurality of magnetic members can be within the base member at different positions between the back edge and the front edge of the base member and within the display member to attract the display member to one of the positions between the back edge and the front edge.

In another example, a portable computing device can include a display member. A support member can include a first end rotatably attached to the display member. A base member can be rotatably attached to a second end of the support member opposite the display member. A surface of the base member can support an edge of the display member at one of a first position and a second position on the surface of the base member. A keyboard can be between the first position and the second position. A touch sensitive pointing device can be between the second position and the back edge of the base member. A magnetic member can be at the first position and a magnetic member can be at the second position within the base member to attract the display member to one of the first and second position of the base member. A magnetic member can be within the support member to attract the display member to the support member.

Figure 1:
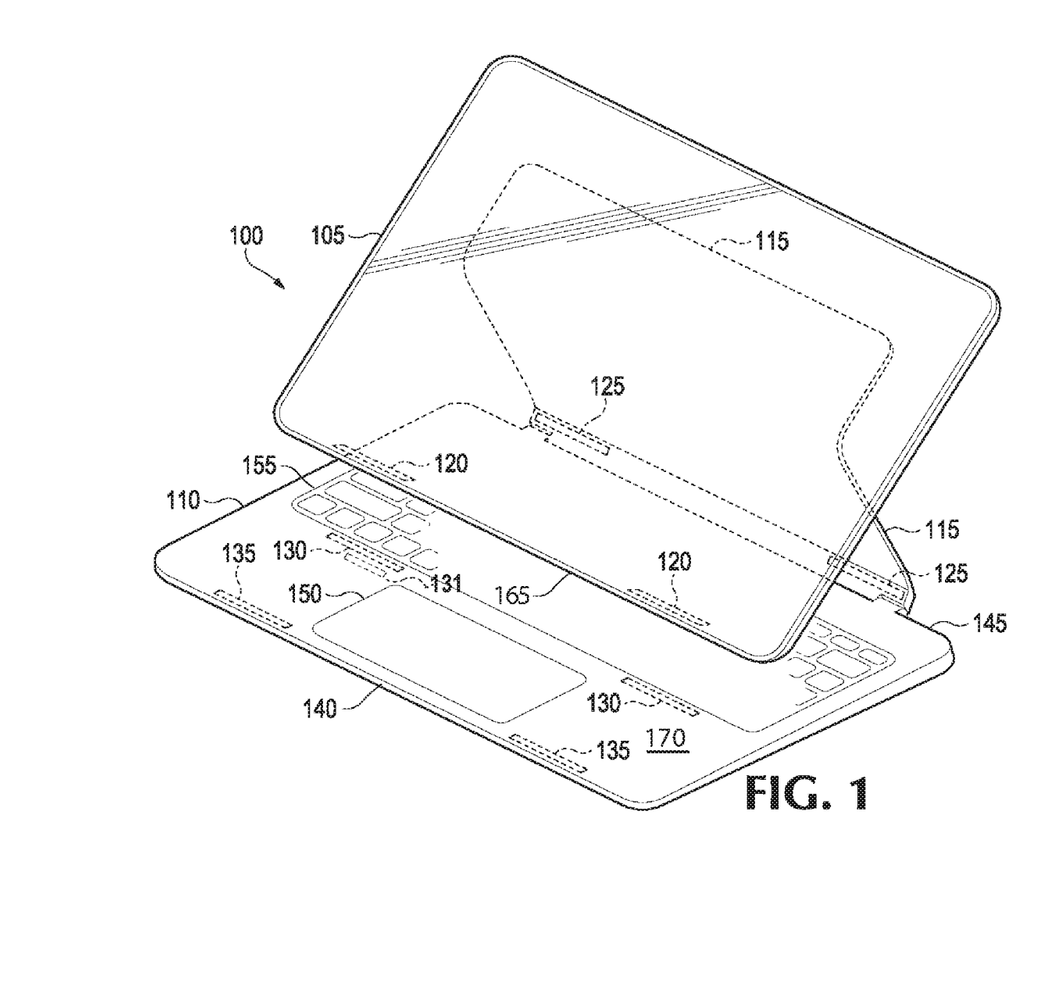
FIG. 1 is a perspective of a computing device according to an example implementation.

With reference to the figures, FIG. 1 is a perspective view of a computing device according to an example implementation. A computing device 100 can include a display member 105 and a base member 110. The display member 105 may be substantially rectangular. The display member may be metal, plastic, fiber resin, or another material. The display member 105 may enclose a display such as an LCD (Liquid Crystal Display), OLED (organic light emitting display) or another type of display. The display member may be substantially planar for example. The display may be a touch screen display that can recognize a user interacting with the display, for example via touching the display. The base member 110 may be substantially rectangular. The base member 110 may be may be metal, plastic, fiber resin, or another material. The base member 110 may include input devices such as a keyboard, a touch sensitive pointing device, or other input devices. The base member 110 may also include feet or other friction increasing components on a bottom surface for placing the computing device on a surface such as a desk or table. The display member or the base member may include components of the computing device such as a processor, memory, mass storage, a printed circuit board, battery or other components.

A support member 115 can be attached between the display member 105 and the base member 110. For example the support member may be rotatably attached to the back edge 145 of the base member 110 and the display member 105 may be rotatably attached to the support member 115. The support member may be metal, plastic, fiber resin, or another material. The support member 115 may extend from the display member 105 at a plurality of angles. The support member 115 may be attached to the base member near the back edge 145 of the base member 110.

A magnetic latch can magnetically attract the edge 165 of the display member to one of the support member 105 and the first surface 170 of the base member 110. The first surface 170 may be substantially planar. The magnetic latch may include a magnetic member in the base member such as a magnetic member 130 and a magnetic member 120 in the display member 105 wherein the magnetic member 120 in the display member 105 is attracted to the magnetic member 130 in the base member 110. Additionally the support member 115 can include a magnetic member 125 attracted to the magnetic member 120 of the display member 105. In some implementations a magnetic member 135 can be in the base member 110.

A magnetic member 120 can be attached to the display member 105. Examples of a magnet that can be used in the magnetic latch may be for example a permanent magnet, an electro magnet, a rare earth magnet or another type of magnets. The magnetic member 120 may be embedded in the display member 105 so that it is not visible outside the display member 105. The magnetic member 120 may be attached to the display member 105 by a fastener such as a screw or clip, adhesive such as glue or epoxy, or another fastener.

A magnetic member 125 can be attached to the support member 115. The magnetic member 125 is attracted to the magnetic member 120, such that the magnetic members bias the display 105 substantially against the support member 115. The support member 115 can rotate away from the base member 110 when the computing device moves from a closed position to an open position. In a closed position a display of the display member may be adjacent to the base member 110. As the support member 115 rotates away from the base member 110, that is as the computing device opens in a clamshell like manner, the display becomes visible. The magnetic member 125 and the magnetic member 120 may impede the display member 105 from rotating away from the support member 115 when the support member 115 and display member 105 are rotated away from the base member 110. Impeding the display member 105 from rotating away from the support member 115 while opening the computing device may reduce the chance the bottom edge of the display member contacts the base member until the user intends for the display member to rotate away from the support member. Once the support member 115 and the display member 105 rotate away from the base member 110, the attraction force between the magnetic member 120 and the magnetic member 125 may be overcome, for example by a force applied by a user. When a user applies such a force, a force above a threshold of the attraction force between the magnetic members, the magnetic member 120 can rotate away from the magnetic member 125.

A magnetic member 130 can be attached to the base member 110. The magnetic member 130 can attract the magnetic member 120. In the closed position the magnetic member 120 in the display member 105 may not be aligned with a magnetic member 130 in the base member 110 and therefore would not provide a noticeable magnetic attraction. When the display member 105 is rotated away from the support member 115 the magnetic member 120 may attract the magnetic member 130. The base member 110 can support member the edge of to the display member 105 when the magnetic member 120 and magnetic member 125 are attracted to each other.

The magnetic member 130 can be in different locations on the base member 110. The magnetic member may be near the front edge 140 of the base member 110, may be near a midpoint between the front edge 140 and a back edge 145 or could be at any other location on the base member 110.

The computing device may include a magnetic member 135 attached to the base member 110. The attraction between the magnetic member 120 and the magnetic member 125, magnetic member 130 or the magnetic member 135 can allow the display to be in various operating positions depending on the task the user is performing. For example the user may use the device with the display member adjacent to the support member for content creation because the input devices 150 and 155 may be accessible. When the display member is at a mid position or forward position at least one of the input devices may not be accessible as the display would be between a user and the input device making this position of the display member suitable for content consumption. While a magnetic member 130 and a magnetic member 135 are described more magnetic members may be positioned on the base member 110.

A hinge between the support member 115 and the base member 110 can allow the support member 115 to rotate relative to the base member 110. The hinge can be a pin and knuckle style hinge, a flexible material such as spring steel or may be another type of hinge. A hinge between the support member 115 and the display member 105 can allow the display member 105 to rotate relative to the support member 115 to a plurality of angles. In one implementation the support member may be about one half the height of the display member. The length of the support member and the height of the display member can determine where on the display member the support member is attached. When the length of the support member is about one half the height of the display member the support member may be attached at about the midpoint of the display member but the attachment point could be at many different locations on the display member.

An input device 150 may be between a front edge of the base member and the magnetic member 130 for example. The input device 150 may be for example a touch sensitive pointing device. An input device 155 may be between the magnetic member 130 and a back edge 145 of the base member 110. In some implementations, there may be at least of combination of the magnetic member 125, the magnetic member 130, the second magnetic member 135 or any combination thereof.

In one example implementation a computing device 100 can include a base member 110 having a back edge 145 and a front edge 140. A first magnetic member 135 can be attached to the base member 110. A second magnetic member 130 can be attached to the base member 110. A display member 105 can have a magnetic member 120 at a first edge of the display member 105 wherein the magnetic member 120 is attracted to one of the first magnetic member 135 and the second magnetic member 130 causing the display member 105 to be attracted to base member 110. A support member 115 can be attached to the back edge 145 of the base member 110 with a first hinge and attached to the display member 105 with a second hinge.

In another example, a portable computing device 100 can include a base member 110 having a back edge 145 and a front edge 140. A support member 115 can be rotatably attached to the back edge 145 of the base member 110. A display member 105 can be rotatably attached to the support member 115. A plurality of magnetic members (130,135) can be within the base member 110 at different positions between the back edge 145 and the front edge 140 of the base member 110 and within the display member 105 to attract the display member 105 to one of the different positions between the back edge 145 and the front edge 140.

A switch 131 may be included in the base member and when the magnetic member 120 of the display member 105 is in proximity of the magnetically activated switch the switch changes states. For example a reed switch may be near the location of the magnetic member 130. The switch 131 may change states when the magnetic member is in proximity of the switch. The change of states of the switch 131 may cause the computing device to perform a function. For example the computing device may change user interface (UI) settings when the switch 131 changes states. The UI may change from a content creation UI designed for use with the input devices 150 and 155 to a touch UI for user with a touch screen display in the display member 105. The UI changes may be for example increasing the size of icons in the touch UI relative to the content creation UI.

In one example implementation, a computing device 100 can include a base member 110 including a first magnetic member 135 near a first edge 140 and a second magnetic member 130 between the first magnetic member 135 and a back edge 145 of the base member 110. A first input device 150 can be between the second magnetic member 130 and the first magnetic member 135. A second input device 155 can between the second magnetic member 130 and the back edge of the base member 110. A display member can be attached to the base member 110 by a support member 115 to articulate the display member 105. A magnetic member 125 can be attached to the support member 115. A magnetic member 120 can be attracted to attract one of the first magnetic member 135, the second magnetic member 130 and the magnetic member 125. In one example, a first hinge can be between the base member 110 and the support member 115 and a second hinge between the support member 115 and the display member 105.

In another example, a portable computing device 100 can include a display member 105. A support member 115 can include a first end rotatably attached to the display member 105. A base member 110 can be rotatably attached to a second end of the support member 115 opposite the display member 105. A surface 170 of the base member 110 can support an edge 165 of the display member 105 at one of a first position and a second position on the surface 170 of the base member 110. A keyboard 155 can be between the first position and the back edge 145. A touch sensitive pointing device 150 can be between the first position (of the display member 105 when the magnetic member 120 is magnetically attracted to the second magnetic member 130) and the second position (of the display member 105 when the magnetic member 120 is magnetically attracted to the first magnetic member 135). A magnetic member 130 can be at the first position and a magnetic member 135 can be at the second position within the base member 110 to attract the display member 105 to one of the first and second position of the base member 110. A magnetic member 125 can be within the support member 115 to attract the display member 105 to the support member 115.

Figures 2, 2A:
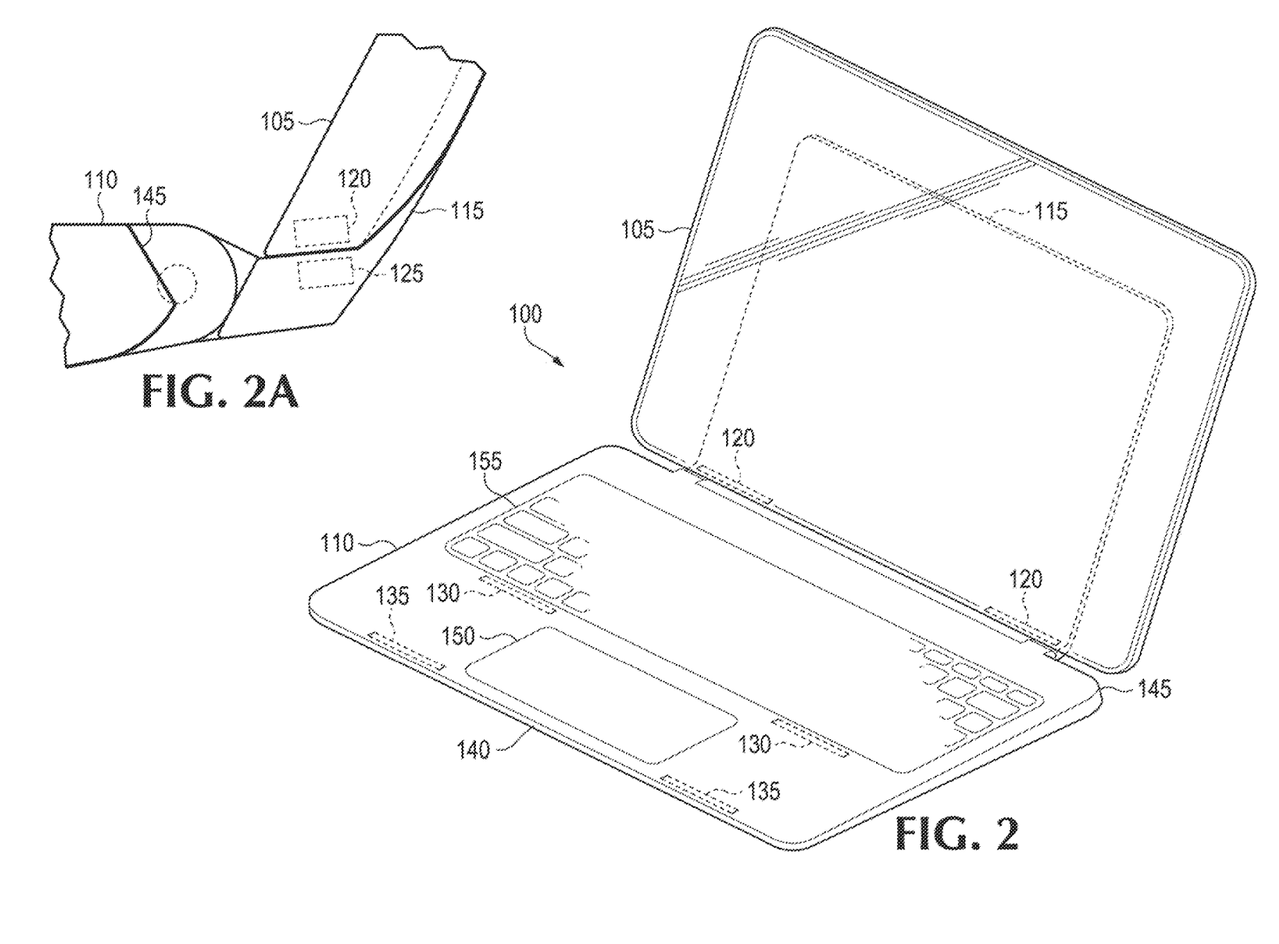
FIG. 2 is a perspective of a computing device in an open position according to an example implementation.
FIG. 2A is a side view of the computing device of FIG. 2.

FIG. 2 is a perspective of a computing device in an open position according to an example implementation. The open position may be described as the laptop mode. The display member 105 is rotated toward the support member 115 which is not visible in FIG. 2. In the open position the input devices such as a keyboard and a touch sensitive pointing device are exposed and accessible. In the open position the display member is attracted to the support member 105 by use of the magnetic member 120 being attracted to the magnetic member 125.

FIG. 2A is a side view of the computing device of FIG. 2. The magnetic member 120 is shown in close proximity to the magnetic member 125 creating a magnetic attractive force between the display member 105 and the support member 115.

Figures 3, 3A:
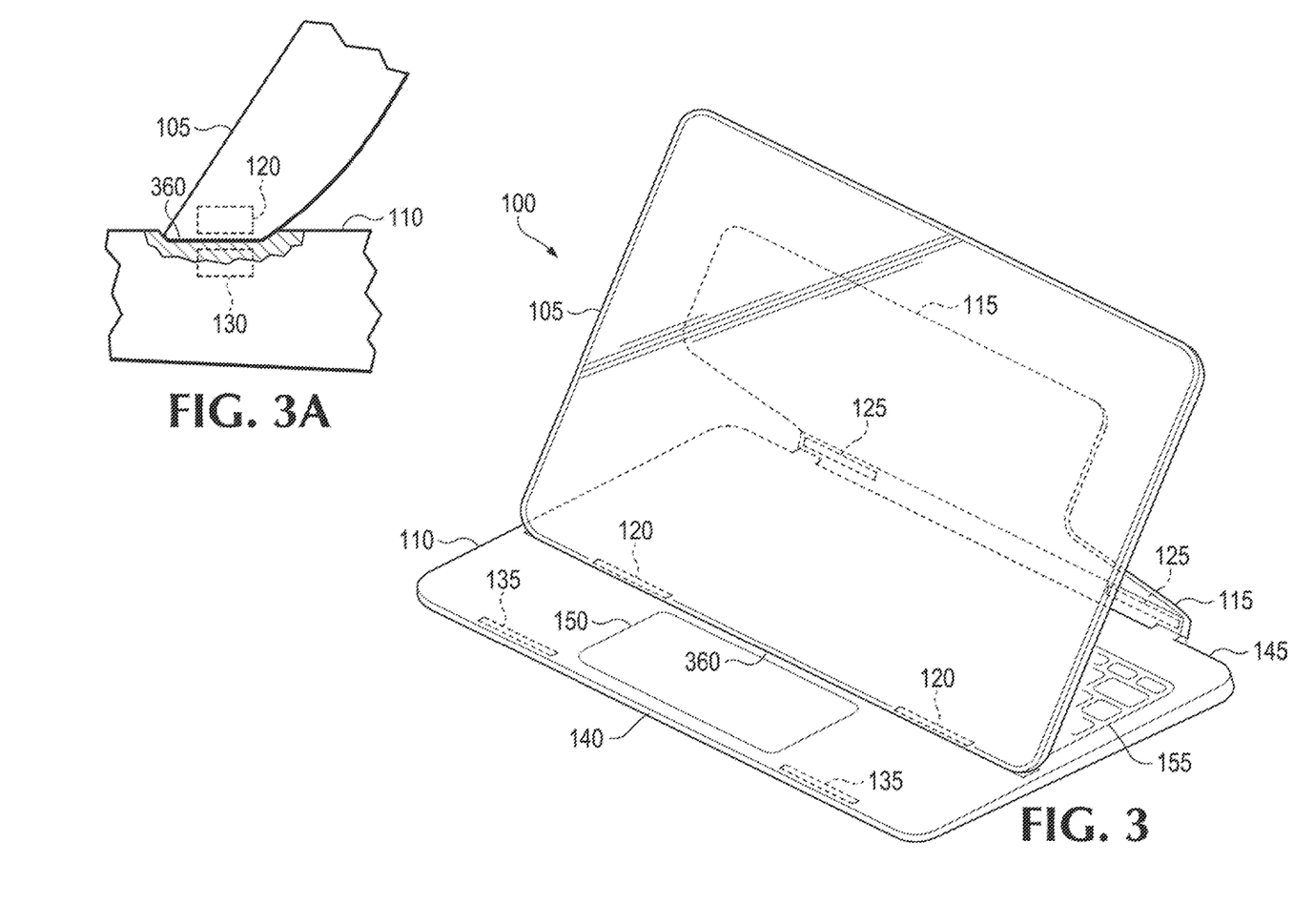
FIG. 3 is a perspective of a computing device in a mid position according to an example implementation.
FIG. 3A is a side view of the computing device of FIG. 3.

FIG. 3 is a perspective view of a computing device in a mid position according to an example implementation. The mid position may be described as the hybrid mode. The mid position may allow an input device to be usable while another input device may not be usable, for example the keyboard may not be accessible if the display member 105 is between the user and the keyboard while the touch sensitive pointing device may be usable when the display member 105 is not between the user and the touch sensitive pointing device. In the mid position the display member 105 is rotated away from the support member 115. The display member edge 165 can rest on the surface 170 of the base member 110. To hold the display at the mid position the magnetic member 120 is attracted to the magnetic member 130.

FIG. 3A is a side view of the computing device of FIG. 3. The magnetic member 120 is attracted to the magnetic member 130 to hold the display member 105 in the mid position. In one implementation the base member 110 may include a depression 360 in the surface. The magnetic member 130 can be aligned with the depression 360 to hold the edge 165 of the display member 105 in the depression 360.

Figure 4:
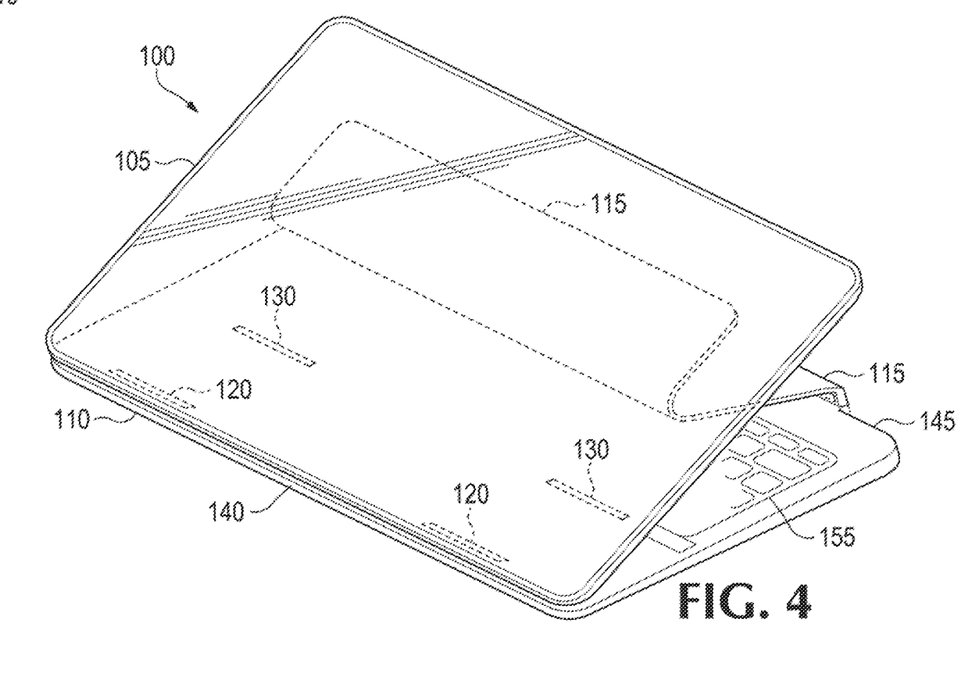
FIG. 4 is a perspective of a computing device in a forward position according to an example implementation.

FIG. 4 is a perspective view of a computing device in a forward position according to an example implementation. The forward position may be described as the tablet mode. The edge of the display member is rotated further from the support member 115 than in the mid position. The edge 165 of the display member 105 is near the front edge 140 of the base member 110. The magnetic latch can include the magnetic member 120 attracted to the magnetic member 135.

Figure 4A:
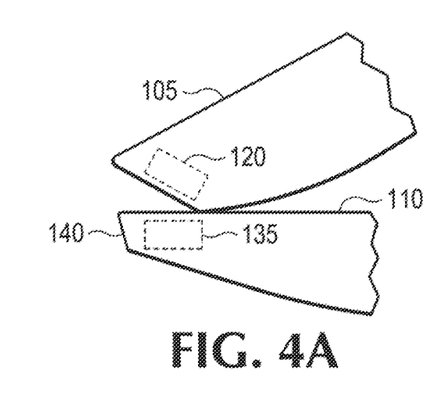
FIG. 4A is a side view of the computing device of FIG. 4.

FIG. 4A is a side view of the computing device of FIG. 4. The magnetic member 120 is shown in proximity to the magnetic member 135.

Figure 5:
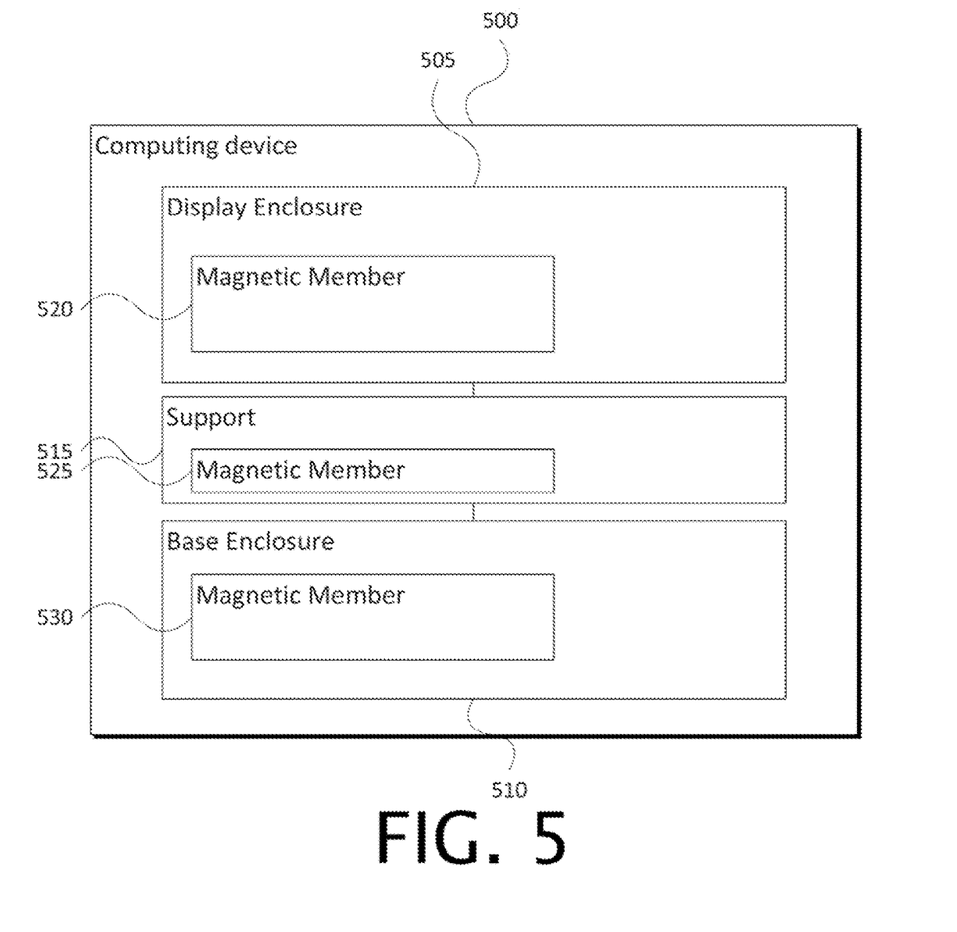
FIG. 5 is a block diagram view of a computing device according to an example implementation.

FIG. 5 is a block diagram view of a computing device according to an example implementation. A computing device 500 can include a display member 505 and a base member 510. The display member may be metal, plastic, fiber resin, or another material. The display member 505 may enclose a display such as an LCD (Liquid Crystal Display), OLED (organic light emitting display) or another type of display. The display may be a touch screen display that recognizes a user touching the display. The base member 510 may be may be metal, plastic, fiber resin, or another material. The display member or base member may include components of the computing device such as a processor, memory, mass storage, a printed circuit board, battery or other components.

A support member 515 can be attached between the display member 505 and the base member 510. The support member may be metal, plastic, fiber resin, or another material. The support member 515 may rotate relative to the base member 510 and the display member 505 may rotate relative to the support member.

A magnetic member 520 can be attached to the display member 505. The magnetic member 520 may be for example a permanent magnet, an electro magnet, a rare earth magnet, or may be materials attracted to magnets such as iron or steel. The magnetic member 520 may be embedded so that it is not visible. The magnetic member 520 may be attached by a fastener such as a screw or clip, adhesive such as glue or epoxy or another way of attachment.

A magnetic member 525 can be attached to the support member 515. The magnetic member 525 is attracted to the magnetic member 520. The support member 515 can rotate away from the base member 510.

A magnetic member 530 can be attached to the base member 510. The magnetic member 530 can attract the magnetic member 520. When the display member 505 is rotated away from the support member 515 the magnetic member 520 may attract the magnetic member 530 and the base member 510 can support the edge of to the display member 505 when the magnetic member 520 and magnetic member 525 are attracted to each other.

Figure 6:
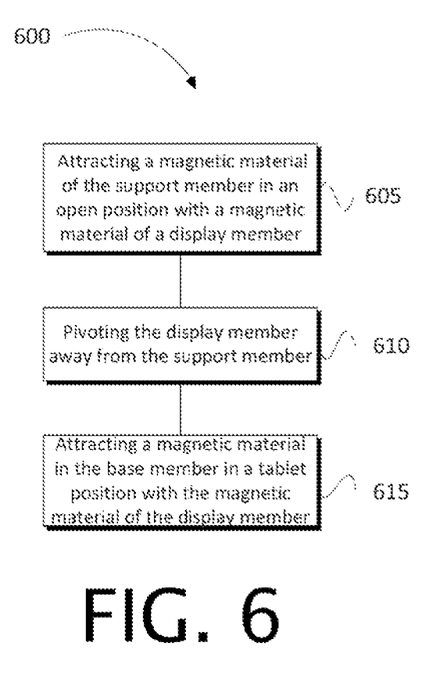
FIG. 6 is a flow chart of a method according to an example implementation.

FIG. 6 is a flow chart of a method according to an example implementation. The method of transitioning the device from an open position or laptop mode to a tablet position may be a tablet mode or a hybrid mode. The tablet position may be the forward position while the hybrid mode may be the mid position. The method 600 may be practiced with the device of FIGS. 1-4.

The method 600 attracts a magnetic member of the support member in an open position with a magnetic member of the display member at 605. A display member can be rotated away from the support member at 610. The magnetic member in the display member can attract a magnetic member in the base member in a tablet position at 615.

It is to be understood that the phraseology and terminology used herein is for the purpose of description and should not be regarded as limiting. The use of "comprising", "including" or "having" are synonymous and variations thereof herein is meant to encompass the items listed thereafter and equivalents thereof as well as additional items. It should also be noted that a plurality of hardware and software based devices, as well as a plurality of different structural components may be used to implement the disclosed methods and systems.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing device comprising:
    a display device comprising a first magnet;
    a base member with a first surface and comprising a second magnet; and
    a support member comprising a third magnet and attached between the display device and the base member, wherein the display device is rotatably attached to the support member, and the display device is rotatable to a plurality of angles with respect to the support member;
    wherein the third magnet is to magnetically attract the first magnet to hold the display device in a retracted position against a surface of the support member, and the support member has a curved contact surface to contact a corresponding curved surface of the display device when the display device is at the retracted position, and wherein the second magnet is to magnetically attract the first magnet to position the display device at a first position away from the support member and over the first surface of the base member.

2. The computing device of claim 1, wherein the base member comprises a first input device, and wherein the display device when at the first position obstructs the first input device to render the first input device unusable by a user.

3. The computing device of claim 2, wherein the base member includes a second input device that is not obstructed when the display device is at the first position such that the second input device is usable by the user.

4. The computing device of claim 3, wherein the base member further comprises a fourth magnet, wherein the fourth magnet is to magnetically attract the first magnet to position the display device at a second position away from the support member and over the first surface of the base member, wherein the second position is different from the first position, and wherein the display device at the second position obstructs both the first and second input devices to render the first and second input devices unusable by the user.

5. The computing device of claim 4, wherein the magnetic attraction between the third magnet and the first magnet is overcome responsive to a user force applied to the display device to move the display device from the retracted position toward one of the first and second positions.

6. The computing device of claim 1, further comprising a hinge between the support member and the base member.

7. The computing device of claim 1, further comprising a hinge between the support member and the display device.

8. The computing device of claim 1, further comprising a switch in the base member, the switch to magnetically activate in response to a proximity of the first magnet in the display device, wherein the computing device is responsive to the magnetic activation of the switch by changing a user interface displayed by the display device from a first mode where user input is received using an input device separate from the display device, and a second mode where user input is received using a touch-sensitive surface of the display device.

9. The computing device of claim 1, further comprising a depression in the base member to hold an edge of the display device when the display device is at the first position.

10. A portable computing device comprising:
    a base member comprising first and second magnets and having a back edge and a front edge;
    a support member comprising a third magnet and rotatably attached to the back edge of the base member;
    a display device comprising a fourth magnet and rotatably attached to the support member,
    wherein the third magnet is to magnetically attract the fourth magnet to hold the display device in a retracted position against a surface of the support member, and the first and second magnets are to magnetically attract the fourth magnet to position the display device at respective first and second positions away from the support member between the back edge and the front edge of the base member;
    a switch in the base member to change states when the fourth magnet of the display device is in proximity of the switch; and
    a processor responsive to the changing states of the switch by changing a user interface displayed by the display device from a first mode where user input is received using an input device separate from the display device, and a second mode where user input is received using a touch-sensitive surface of the display device.

11. The portable computing device of claim 10, further comprising the input device between the first and second magnets in the base member.

12. The portable computing device of claim 11, wherein when the display device is positioned at the first position responsive to magnetic attraction between the first magnet and the fourth magnet, the input device is exposed and accessible for use by a user, and wherein when the display device is positioned at the second position responsive to magnetic attraction between the second magnet and the fourth magnet, the input device is obstructed by the display device and inaccessible for use by the user.

13. The portable computing device of claim 10, wherein the support member has a curved contact surface to contact a corresponding curved surface of the display device when the display device is at the retracted position.

14. A method comprising:
- rotatably attaching a first end of a support member to a display device, the support member comprising a first magnet, and the display device comprising a second magnet;
- rotatably attaching a second end of the support member to a base member comprising a third magnet and a keyboard, wherein the second magnet is to magnetically attract the first magnet to hold the display device in a retracted position against a surface of the support member, and the third magnet is to magnetically attract the second magnet to position the display device at a first position away from the support member and over a surface of the base member; and
- providing the support member with a curved contact surface to contact a corresponding curved surface of the display device when the display device is at the retracted position.

15. The method of claim 14, wherein the base member further comprises a fourth magnet to magnetically attract the second member to position the display device at a second position over the surface of the base member, the second position different from the first position.

16. The method of claim 15, wherein in the first position the display device does not obstruct the keyboard, and in the second position the display device obstructs the keyboard.

* * * * *